United States Patent
Allen et al.

(10) Patent No.: US 12,094,346 B2
(45) Date of Patent: *Sep. 17, 2024

(54) SHARED MOBILITY SIMULATION AND PREDICTION SYSTEM

(71) Applicant: Allstate Insurance Company, Northbrook, IL (US)

(72) Inventors: Rachel Edelshteyn Allen, Chicago, IL (US); Benjamin Labaschin, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,957

(22) Filed: Aug. 2, 2022

(65) Prior Publication Data

US 2023/0206768 A1  Jun. 29, 2023

Related U.S. Application Data

(63) Continuation of application No. 16/411,334, filed on May 14, 2019, now Pat. No. 11,403,953.

(60) Provisional application No. 62/671,203, filed on May 14, 2018.

(51) Int. Cl.
*G08G 1/00* (2006.01)
*G06Q 30/0204* (2023.01)
*G06Q 50/40* (2024.01)

(52) U.S. Cl.
CPC ......... *G08G 1/207* (2013.01); *G06Q 30/0205* (2013.01); *G06Q 50/40* (2024.01); *G08G 1/202* (2013.01)

(58) Field of Classification Search
None
See application file for complete search history.

(56) References Cited

U.S. PATENT DOCUMENTS

| | | |
|---|---|---|
| 2010/0280700 A1 | 11/2010 | Morgal et al. |
| 2011/0112717 A1 | 5/2011 | Resner |
| 2014/0229258 A1* | 8/2014 | Seriani ............ G06Q 10/06311 |
| | | 705/14.23 |
| 2015/0242944 A1 | 8/2015 | Willard et al. |
| 2015/0370253 A1 | 12/2015 | Gurin |
| 2016/0027307 A1* | 1/2016 | Abhyanker ............ G08G 1/202 |
| | | 701/117 |
| 2016/0189308 A1 | 6/2016 | Bogovich et al. |
| 2016/0364678 A1 | 12/2016 | Cao |

(Continued)

OTHER PUBLICATIONS

International Preliminary Report on Patentability for International Application No. PCT/US2019/032151, mailed Nov. 26, 2020, 6 pages.

(Continued)

*Primary Examiner* — Tamara L Weber
(74) *Attorney, Agent, or Firm* — Akerman LLP

(57) ABSTRACT

A system may receive information indicating a service area of a shared mobility service, calculate information indicating one or more of risk or revenue associated with the provision of shared mobility services in the service area, determine an adjusted service area, wherein the adjusted service area is associated with one or more of a reduction in risk or an increase in revenue, and transmit information indicating the adjusted service area to a device associated with the shared mobility service.

17 Claims, 9 Drawing Sheets

(56) References Cited

U.S. PATENT DOCUMENTS

2018/0315148 A1   11/2018  Luo et al.
2018/0342113 A1   11/2018  Kislovskiy et al.
2019/0156670 A1*  5/2019  O'Sullivan ........ G01C 21/3423
2020/0249047 A1    8/2020  Balva

OTHER PUBLICATIONS

International Search Report and Written Opinion for International Application No. PCT/US2019/032151, mailed Jul. 29, 2019, 7 pages.

Ma W-M., et al., "On-Line Taxi Problem on the Benefit-Cost Graphs," Proceedings of the Fifth International Conference on Machine Learning and Cybernetics, Dalian, Aug. 13-16, 2006, pp. 900-905.

Murphy K.P., "Machine Learning: A Probabilistic Perspective," Massachusetts Institute of Technology, 2012, 1 Page.

Written Opinion for International Application No. PCT/US2019/032151, mailed Jul. 29, 2019, 4 pages.

\* cited by examiner

Summary Page – Driver Information

1. Driver ID 1   Date Added: 04/23/18
   Prequal Score:   900
   Combined Risk: 41%
   Bodily Injury:   19%
   Collision:       68%
   Comprehensive: 66%
   Property:        14%
   Enrollment:      Pending 2. Driver ID 2 ...

[Un-select]

[Back]   [Add New Driver]

FIG. 3

Summary Page – Fleet Information

1. Average Prequalification Score:   295

2. Fleetwide Annual Risk Total: $15k
   Bodily Injury:    $7k
   Collision:        $3k
   Comprehensive: $3k
   Property:         $3k 3. Tips: 2% of your riskiest drivers account for 9% of your cost

[Back]

FIG. 4

Revenue Estimation

Input Selections
Period: Jan. 1, 2019 – Jan. 31, 2019
Minimum $ per driver/day for safest drivers: $20
Maximum $ per driver/day for riskiest driver: $300
Average Days per driver/year: 250

Revenue Estimate for Jan. 1, 2019 – Jan. 31, 2019:

$400,000 collected by 100 drivers

Back

FIG. 6

Customer Lifetime Value Estimation

Input Selections
Minimum $ per driver/day for safest drivers: $20
Maximum $ per driver/day for riskiest driver: $300
Average Days per driver/year: 250
Yearly Retention Rate: 90%
Driver Avg. Lifetime: 500 days

Customer Lifetime Value Estimate:

$X

Back

FIG. 7

Restricted-Location Estimates

Input Locations:
Pickup Zip Codes:    60622, 60601, 60614
Dropoff Zip Codes:   60622, 60601, 60613, 60614

Yearly Revenue Estimate:    $X
Customer Lifetime Value     $Y

Suggestions:
Include zip code 60602 to improve revenues 10%
Remove zip code 60601 to improve customer lifetime value 7%

Back

FIG. 10

SHARED MOBILITY SIMULATION AND PREDICTION SYSTEM

CROSS-REFERENCE TO RELATED APPLICATIONS

The present application claims priority to U.S. patent application Ser. No. 16/411,334 filed on May 14, 2019, which is incorporated by reference in its entirety herein.

BACKGROUND

Aspects of the disclosure relate to simulating the effect of changes to shared mobility services and predicting other aspects of shared mobility services. Shared mobility services are becoming increasingly common as shared mobility applications and services continue to improve. New services are rapidly entering the increasingly-competitive market. Due to the rapidly changing landscape, it may be difficult to predict how to optimize a shared mobility service and how such optimizations will effect aspects of the shared mobility service in the future.

SUMMARY

Aspects of the disclosure provide effective, efficient, scalable, and convenient technical solutions that address and overcome the technical problems associated with operating shared mobility services safely and effectively. Data regarding drivers may be collected and managed in order to simulate the effects of changes to a shared mobility service. Shared mobility services may include rideshare services, carpool services, bike sharing services, microtransit services (e.g., scooter-sharing services), autonomous taxi services, peer-to-peer services, and other shared mobility services.

In accordance with the embodiments described below, a system may receive information indicating a service area of a shared mobility service, calculate information indicating one or more of risk or revenue associated with the provision of shared mobility services in the service area, determine an adjusted service area, wherein the adjusted service area is associated with one or more of a reduction in risk or an increase in revenue, and transmit information indicating the adjusted service area to a device associated with the shared mobility service.

In some cases, the information indicating a service area comprises one or more zip codes. Additionally or alternatively, the information indicating a service area comprises an isochrone map.

In some cases, to determine the adjusted service area, the system may iteratively adjust the service area to optimize one or more of risk or revenue. The system may iteratively adjust the service area by adding zip codes to or removing zip codes from the service area. Additionally or alternatively, system may iteratively adjust the service area by iteratively increasing or decreasing the service area based on travel time from a given location.

In some cases, to calculate the information indicating one or more of risk or revenue, the system may determine a risk adjusted price per mile and determine an estimated demand, wherein the calculated information indicates risk and is based on the risk adjusted price per mile and the estimated demand.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 depicts an example summary page 300 illustrating a display of driver-specific information in accordance with one or more example embodiments;

FIG. 4 depicts an example summary page 400 illustrating a display of fleetwide summary information in accordance with one or more example embodiments;

FIG. 6 depicts an example user interface 600 for displaying a revenue estimate in accordance with one or more example embodiments;

FIG. 7 depicts an example user interface 700 for displaying a customer lifetime value estimate in accordance with one or more example embodiments;

FIG. 10 depicts an example user interface 1000 for displaying location-restricted revenue and customer lifetime value estimates in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Figure 1:
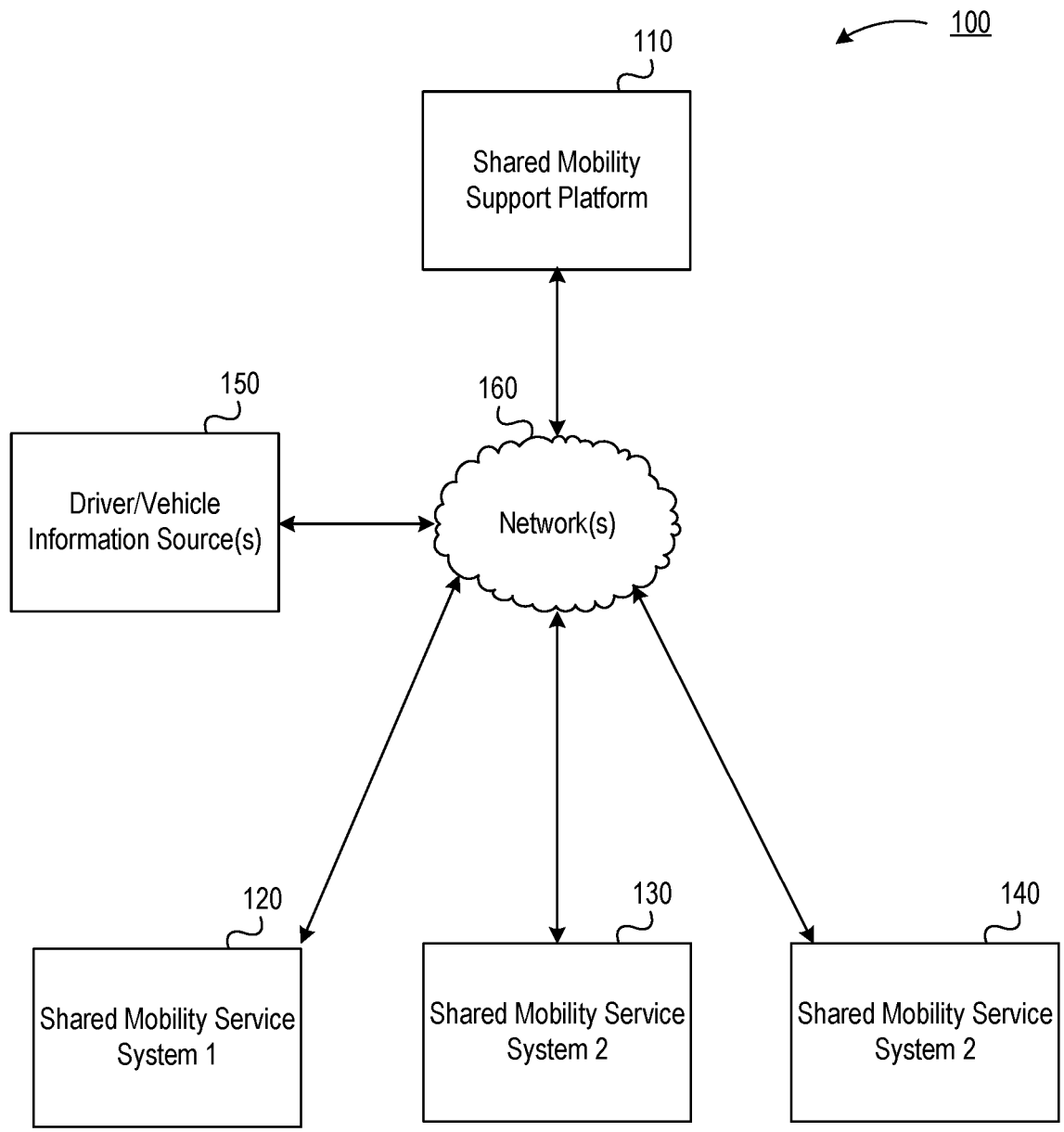
FIG. 1 depicts an illustrative operating environment for providing shared mobility simulations and predictions accordance with one or more example embodiments.

FIG. 1 depicts an illustrative operating environment for performing simulation and prediction services for one or more shared mobility services in accordance with one or more example embodiments. Referring to FIG. 1, operating environment 100 may include a shared mobility support platform 110, a first shared mobility service system 120, a second shared mobility service system 130, a third shared mobility service system 140, and driver/vehicle information source(s) 150. The shared mobility support platform 110 may be managed by and/or associated with an entity that provides services to one or more shared mobility systems, such as an insurance company and/or a business to business (B2B) services company. The shared mobility service systems 120, 130, 140 may be managed by and/or associated with respective shared mobility service companies (e.g., different rideshare companies). The shared mobility support platform 110 may be used to interface with and provide services to the various shared mobility services. In some of the embodiments discussed below, the shared mobility support platform 110 may provide information to one shared mobility service that is derived from (e.g., anonymized) information associated with another shared mobility service. Such cross-service information sharing may be opt-in and may beneficially allow the shared mobility support platform 110 to provide mutually beneficial recommendations—a capability that previous solutions cannot provide.

In one or more arrangements, the shared mobility support platform 110, the first shared mobility service system 120, the second shared mobility service system 130, the third shared mobility service system 140, and the driver/vehicle information source(s) 150 may be connected by network(s) 160 (e.g., the Internet and/or other networks, including private networks), each of which may include one or more wired networks and/or one or more wireless networks. In addition, each of the shared mobility support platform 110, the first shared mobility service system 120, the second shared mobility service system 130, the third shared mobility service system 140, and the driver/vehicle information source(s) 150 may be special purpose computing devices configured to perform specific functions, as described in greater detail below, and may include specific computing components such as processors, memories, communication interfaces, and/or the like.

For example, shared mobility support platform 110 may be configured to gather information about a shared mobility service, such as driver information and other information, and perform simulations and prediction functions in order to estimate the effect of changes to the shared mobility service, as well as other functions. The shared mobility service systems 120, 130, 140 may be configured to manage respective shared mobility services, (e.g., including receiving requests for vehicles, offering vehicles to drivers, and other shared mobility service management or control functions), as well as to interface with the shared mobility support platform 110 to access one or more simulation and prediction functions. In some embodiments, the shared mobility support platform 110 may be associated with a first organization (e.g., a insurance company providing shared mobility services or other B2B service company), and shared mobility service systems 120, 130, 140 may each be associated with respective other organizations (e.g., shared mobility companies providing rideshare services, carpool services, and the like).

Driver/vehicle information source(s) 150 may be configured to collect, manage, and provide information about drivers and/or vehicles, including demographics data, accident history, vehicle maintenance records, driving habits information, preference information (e.g., online purchase information), and the like. In some cases, such information may include information associated with a driver's previous performance for and/or employment with other shared mobility services.

Figure 2:
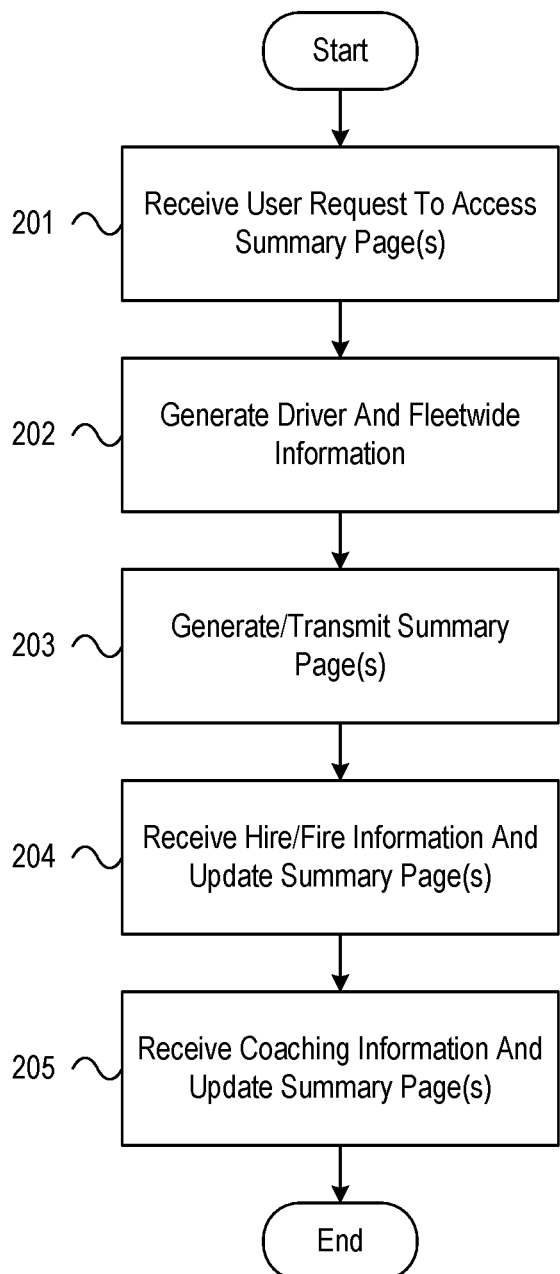
FIG. 2 depicts an illustrative method for predicting the effect of hire and fire decisions in accordance with one or more example embodiments.

FIG. 2 depicts an illustrative method for determining hire/fire decisions in a shared mobility context. At step 201, a user (e.g., an operator affiliated with a particular shared mobility service and using one of the shared mobility service systems 120, 130, 140) may request to access a driver summary page that shows one or more shared mobility statistics and other information for each driver and for a fleet of drivers associated with a particular shared mobility service. For example, a user associated with a first shared mobility service may log into a shared mobility support platform 110 that provides shared mobility services, statistics, predictions, and other shared mobility services for a plurality of shared mobility services. The user may request to review information associated with one or more drivers of the first shared mobility fleet, e.g., by interacting with a user interface generated by the shared mobility support platform 110.

At step 202, the shared mobility support platform 110 may generate the driver summary page and look up or calculate the statistics and other information for each driver and for the shared mobility service fleet, as requested by the user. Accordingly, the shared mobility support platform 110 may access information regarding one or more drivers stored or provided to the shared mobility support platform 110 (e.g., by one or more of the shared mobility service systems 120, 130, 140) and/or obtain additional information regarding the one or more drivers (e.g., from one or more driver/vehicle information sources 150).

For example, the shared mobility support platform 110 may obtain, for each driver, information including a driver ID, a date the driver was added to the fleet, a prequalification score, a combined risk associated with the driver, a risk of bodily injury associated with the driver, a risk of collision associated with the driver, a risk of comprehensive damage associated with the driver, a risk of property damage associated with the driver, and/or an enrollment status of the driver. In some cases, obtaining information for each driver may include obtaining information associated with a driver's performance for and/or employment with other shared mobility services than the particular shared mobility service associated with the user request of step 201.

To obtain the combined risk associated with the driver, the risk of bodily injury associated with the driver, the risk of collision associated with the driver, the risk of comprehensive damage associated with the driver, and/or the risk of property damage associated with the driver, the shared mobility support platform 110 may obtain information about each driver and estimate the risk(s) for each driver using one or more algorithms. For example, the shared mobility support platform 110 may use machine learning models to calculate one or more risk scores, including an estimated combined risk associated with the driver, a risk of bodily injury associated with the driver, a risk of collision associated with the driver, a risk of comprehensive damage associated with the driver, and/or a risk of property damage associated with the driver.

The shared mobility support platform 110 may use one or more risk score models trained on training data to calculate one or more risk scores. The one or more risk score models may be trained using machine-learning techniques, statistical techniques, and/or other such techniques for correlating one or more features with historical outcome data. The shared mobility support platform 110 may train the one or more models prior to executing the method of FIG. 2. For example, to calculate a risk of bodily injury, the training data may include indications of accidents involving bodily injury correlated with driver information. Similarly, to calculate a risk of collision, the training data may include indications accidents involving collisions correlated with driver information. Accordingly, the one or risk score models may calculate one or more risk scores that estimate, for example, combined risk associated with the driver, risk of bodily injury associated with the driver, risk of collision associated with the driver, risk of comprehensive damage associated with the driver, and/or risk of property damage associated with the driver. In some embodiments, one risk score model may be trained to calculate a risk score associated with a combined risk, another risk model may be trained to calculate a risk score associated with a risk of bodily injury, and so on such that each risk determination is calculated using a different risk score model.

The shared mobility support platform 110 may train a risk score model using training data that correlates driver information with indicators of various types of risk. For example, the training data set may include driver information obtained from an MVR, such as endorsements, license class, license statuses, license restrictions, and the like. Additionally or alternatively, driver information may include background check and other information such as criminal records, commercial records, financial records, credit scores, purchase histories, web browsing histories, videos watched, and the like. The indicators of risk may include accident data as well as tickets, license suspensions and/or cancellations, and the like. In some embodiments, such a risk score model may be trained to output a continuous value indicating an estimated percentage risk (e.g., a likelihood of an incident occurring) over a given period (e.g., yearly). In some embodiments, such a risk score model may be trained to output a continuous value indicating an estimated cost (e.g., a damages value) over a given period (e.g., yearly). Additionally or alternatively, a model may be trained to output a discrete value indicating, for example, an estimated range of risk (e.g., categories including least risky, average, most risky, etc.). For example, the model may classify a driver or rider into one of 5 discrete risk categories.

Accordingly, at step 202, the shared mobility support platform 110 may use the driver information (which it may obtain from one or more shared mobility service systems 120, 130, 140 and/or the driver/vehicle information source(s) 150) as inputs to the one or more risk score models to obtain risk scores for each driver of the fleet. In some embodiments, the shared mobility support platform 110 may extract and/or calculate features from the driver information before using the features as inputs to the one or more risk score models. The shared mobility support platform 110 may then determine, using the one or more risk score models, one or more risk scores for each driver.

Also at step 202, the shared mobility support platform 110 may determine a prequalification score for each driver. The prequalification score may be a function of the one or more risk scores (e.g., a weighted average of multiple risk scores or the like), and may be normalized into a specific range.

Also at step 202, the shared mobility support platform 110 may generate fleet-wide information based on the information associated with all of the drivers of the fleet (which may be the entire fleet for a particular shared mobility service or a location-specific fleet, such as a fleet for the Chicagoland area). For example, the shared mobility support platform 110 may generate one or more average fleet risk scores by averaging the risk scores of individual drivers, may generate an average prequalification score by averaging the prequalification scores of individual drivers, and the like.

At step 203, the shared mobility support platform 110 may generate one or more summary pages containing both driver-specific and fleet-wide information. The summary pages may be transmitted (e.g., to a shared mobility service system 120) for display. FIG. 3 depicts an example summary page 300 illustrating a display of driver-specific information, including date a first driver was added, a prequalification score for the first driver, a combined risk score for the first driver, a bodily injury score for the first driver, a collision score for the first driver, a comprehensive score for the first driver, a property score for the first driver, and an enrollment status of the first driver. Information for other drivers (e.g., second through Nth drivers) may also be displayed in the summary page 300.

FIG. 4 depicts an example summary page 400 illustrating a display of fleet-wide summary information, including an average prequalification score, cost totals for various types of risk, and tips to reduce cost. The shared mobility support platform 110 may generate the summary pages 300, 400 based on data obtained and/or calculated by the shared mobility support platform 110, and allow a user to navigate between the summary pages as requested. In some cases, the shared mobility support platform may provide insights based on the generated information. For example, the shared mobility support platform may indicate which drivers are generating the most risk and/or cost, and/or may indicate that a certain percentage of drivers are responsible for at least a threshold percentage of a total risk and/or cost.

At step 204, the shared mobility support platform 110 may receive hire/fire information for one or more drivers. For example, a user may interact with the user interface 300 generated at step 203 to unselect one or more drivers in order to see a change in the summary statistics for the fleet. For example, after un-selecting one or more drivers in the user interface 300, the user may access the user interface 400, which may contain fleet-wide statistics updated to not include the information associated with the un-selected drivers. The shared mobility support platform 110 may thus recalculate the fleet-wide statistics and re-generate the user interface 400 after the user unselects one or more drivers.

Additionally or alternatively, the received hire/fire information may include information about one or more prospective new drivers. A user may thus add information about a new driver (e.g., by selecting the "Add New Driver" option of user interface 300). The shared mobility support platform 110 may then receive, from the user or from another system (e.g., based on identification information provided by the user), information about the one or more new drivers and use the information to generate risk score and prequalification score information for the new driver, as discussed above for step 202. The shared mobility support platform 110 may then update the user interfaces 300 and 400 to account for the newly added driver.

At step 205, the shared mobility support platform 110 may receive input information about coaching drivers. For example, a user may indicate a coaching plan by specifying a number of drivers that will receive coaching and/or a minimum prequalification score threshold below which drivers will receive coaching. The shared mobility support platform 110 may then indicate a predicted improvement in driver information based on the coaching plan. In some embodiments, the shared mobility support platform 110 may use a machine-learning or other type of model to estimate the effect of coaching based on driver information associated with the driver (which may be obtained from sources 150 and/or one or more shared mobility service systems 120, 130, 140, as discussed above).

The shared mobility support platform 110 may thus use a coaching effectiveness model trained on training data to calculate an improvement after coaching. The coaching effectiveness model may be trained using machine-learning techniques, statistical techniques, and/or other such techniques for correlating one or more features with historical coaching effectiveness data. The shared mobility support platform 110 may train the coaching effectiveness model prior to executing the method of FIG. 2. For example, the coaching effectiveness data may include indications of how much drivers improved in the past after coaching, and the indications may be correlated with driver information. Accordingly, the coaching effectiveness model may calculate an effectiveness score that estimates, for example, a percentage improvement associated with each driver scheduled for coaching.

The shared mobility support platform 110 may train a coaching effectiveness model using training data that correlates driver information with indicators of improvement after coaching. For example, the training data set may include driver information obtained from an MVR, such as endorsements, license class, license statuses, license restrictions, and the like. Additionally or alternatively, driver information may include background check and other information such as criminal records, commercial records, financial records, credit scores, purchase histories, web browsing histories, videos watched, and the like. The indicators of improvement may include indicators of accident data before and after coaching, of tickets before and after coaching, of license suspensions and/or cancellations before and after coaching, and the like. In some embodiments, such a coaching effectiveness model may be trained to output a continuous value indicating an estimated percentage improvement after coaching.

Accordingly, the shared mobility support platform 110 may use the driver information for each driver in the coaching plan as inputs to the coaching effectiveness model to obtain predicted improvement scores for each driver of the coaching plan. In some embodiments, the shared mobility support platform 110 may extract and/or calculate features from the driver information before using the features as inputs to the coaching effectiveness model. The shared mobility support platform 110 may then determine, using the predicted coaching effectiveness, the predicted improvement score for each driver of the coaching plan.

The shared mobility support platform 110 may then update the user interfaces 300 and 400 based on the predicted improvements. For example, the driver information and/or fleet information may reflect the predicted improvements for each driver associated with the coaching plan.

Figure 5:
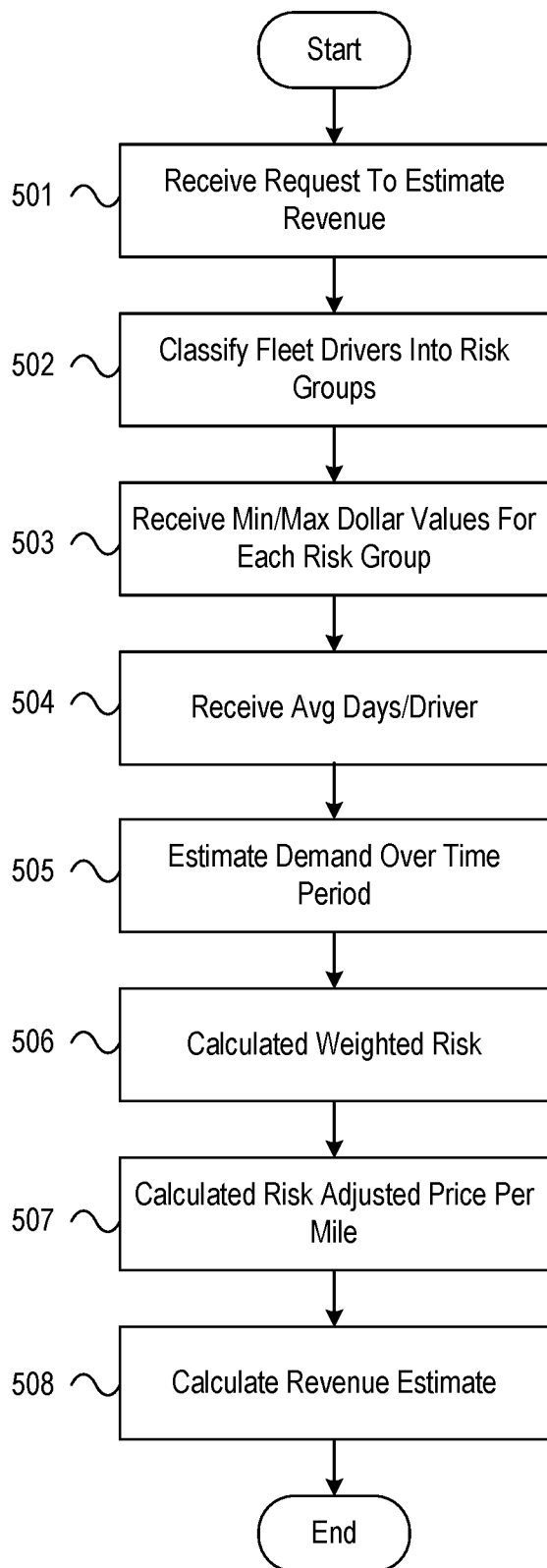
FIG. 5 depicts an illustrative method for estimating revenue for a shared mobility service in accordance with one or more example embodiments.

FIG. 5 depicts an illustrative method for estimating revenue for a shared mobility service in accordance with one or more example embodiments.

At step 501, the shared mobility support platform 110 may receive a request from a user (e.g., a user associated with a shared mobility service system 120, 130, or 140) to estimate revenue over a given period. The user may specify an arbitrary period for which to estimate shared mobility service revenue.

At step 502, the shared mobility support platform 110 may classify the drivers of a fleet into risk groups. For example, the shared mobility support platform 110 may determine a first group comprising the fleet drivers associated with prequalification scores falling below a first threshold, a second group comprising the fleet drivers associated with prequalification scores above the first threshold but below a second threshold, etc. The shared mobility support platform 110 may thus group the drivers in to a plurality of discrete risk groups (e.g., five total). The prequalification scores may be generated using one or more risk models, as discussed above for step 202.

At step 503, the user of the shared mobility service system 120, 130, or 140 may indicate acceptable minimum or maximum revenues associated with each risk group. For example, the user may indicate a minimum revenue per day (e.g., in dollars) for drivers in the safest group (e.g., the group with the highest prequalification scores), a maximum revenue per day for drivers in the riskiest group (e.g., the group with the lowest prequalification scores), etc.

At step 504, the user of the shared mobility service system may determine a yearly average number of days working per driver. For example, the user may indicate that the average driver associated with the shared mobility service works for 250 days per year. In some cases, the shared mobility support platform 110 may provide a default number of average number of days working per driver generated based on data collected from one or more of shared mobility service systems 120, 130, 140. The user may thus select the default number if desired.

At step 505, the shared mobility support platform 110 may determine a demand estimate for the given period. The shared mobility support platform 110 may generate a demand estimate based on a number of factors. For example, the demand estimate may be based on time of day, weather, day, date, projected numbers of drivers on the road, a price per mile for shared mobility service(s), one or more events, location, and/or population density.

For example, to determine the demand for the next month, the shared mobility support platform 110 may account for occurrences and/or changes of each of the above-mentioned factors over the next month to calculate a demand estimate. For example, the shared mobility support platform 110 may account for time of day by determining how many hours of the next month will be during the evenings (e.g., associated with higher demand), how many hours at noon (e.g., lower demand), how many hours will be during rush hour (higher demand), and the like. Similarly, the shared mobility support platform 110 may account for weather by determining how many days will be associated with certain weather conditions such as rain (higher demand for rides), sunny mild weather (associated with lower demand), cold weather (higher demand), etc.

Similarly, the shared mobility support platform 110 may account for day of the week by determining how many days will be associated with higher demand (e.g., Fridays) or lower demand (e.g., Tuesdays). Similarly, the shared mobility support platform 110 may account for date by determining how many of the days will be holidays (which may be higher or lower demand depending on the holiday).

The shared mobility support platform 110 may account for a number of shared mobility service drivers that will be on the road by looking at historical and projected patterns for not only the shared mobility service associate with the requesting user of step 501, but also based on looking at data associated with any other shared mobility services connected to the shared mobility support platform 110. For example, if a user of a first shared mobility service requests revenue estimates, the shared mobility support platform 110 may calculate demand based on not only historic patterns indicating a projected number of drivers for the first shared mobility service, but also historic patterns indicating a projected number of drivers for second and third shared mobility services. As discussed above, in such cases, the shared mobility support platform 110 may allow such cross-service data projections if each service agrees to it.

The shared mobility support platform 110 may account for a price per mile associated with the shared mobility service and its effect on demand. For example, if shared mobility support platform 110 stores an algorithm indicating when one or more shared mobility services use surge pricing (such an algorithm may be supplied by the shared mobility service or estimated by the shared mobility support platform 110 based on historical data), the shared mobility support platform 110 may account for the effect of surge pricing by one or more shared mobility services on overall demand.

The shared mobility support platform 110 may account for a price per mile associated with multiple shared mobility services and their effect on demand. For example, if one shared mobility service is projected to use surge pricing, but a second is not, then customers will be more likely to use the second service (e.g., assuming similar standard price per mile). The shared mobility support platform 110 may thus store algorithm(s) indicating when various services use surge pricing and leverage these algorithms (e.g., with consent of the other services) to provide modified demand estimates that account for other services' surging.

The shared mobility support platform 110 may further estimate demand based on the effects of location (e.g., higher demand in certain cities or locales than others), upcoming events (e.g., scheduled concerts, festivals, etc. that may increase demand), and population density (e.g., dense cities may be associated with increased demand). Such event, location, and population density information may be obtained from third party sources, such as event calendars, demographic information, and/or historical demand information correlated to various locations and/or population densities.

The shared mobility support platform 110 may thus use a large variety of factors to model demand. The shared mobility support platform 110 may use an algorithm to estimate increases or decreases on demand based on each of the above factors in turn and/or in combination. For example, the shared mobility support platform 110 may use a machine learning model trained on data including the above factors correlated with historic demand levels to estimate demand.

At step 506, the shared mobility support platform 110 may calculate a weighted risk, which may be an average (e.g., fleet-wide) prequalification score coerced to a weighted percentage. For example, higher fleet-wide prequalification scores indicate that a particular service is targeting less risk, which may increase costs by lowering per mile revenues. Conversely, lower fleet-wide prequalification scores indicate that a particular service is accepting greater risk in the hopes of increasing revenues.

At step 507, the shared mobility support platform 110 may calculate a risk adjusted price per mile. The risk-adjusted price per mile may be calculated using the example formula:

$$RAPPM = \frac{1}{1 - \text{weighted risk}} * \text{standard } PPM$$

where RAPPM is the risk adjusted price per mile, the weighed risk was calculated at step 506, and the standard price per mile is a standard cost associated with the service. Other example formulas may be used as alternatives.

Finally, at step 508, the shared mobility support platform 110 may calculate a revenue estimate for the specified period by multiplying the risk adjusted price per mile by the demand for the period. The resulting revenue estimate may be displayed to the user.

FIG. 6 depicts an example user interface 600 for displaying a revenue estimate. The user interface 600 may include areas for inputting a period associated with the revenue estimate, minimum/maximum dollar figures for various risk groups (e.g., as described at step 503), and an average days per driver/year (e.g., as described at step 504). The user interface 600 may further indicate an estimated revenue as determined at step 508.

Figure 8:
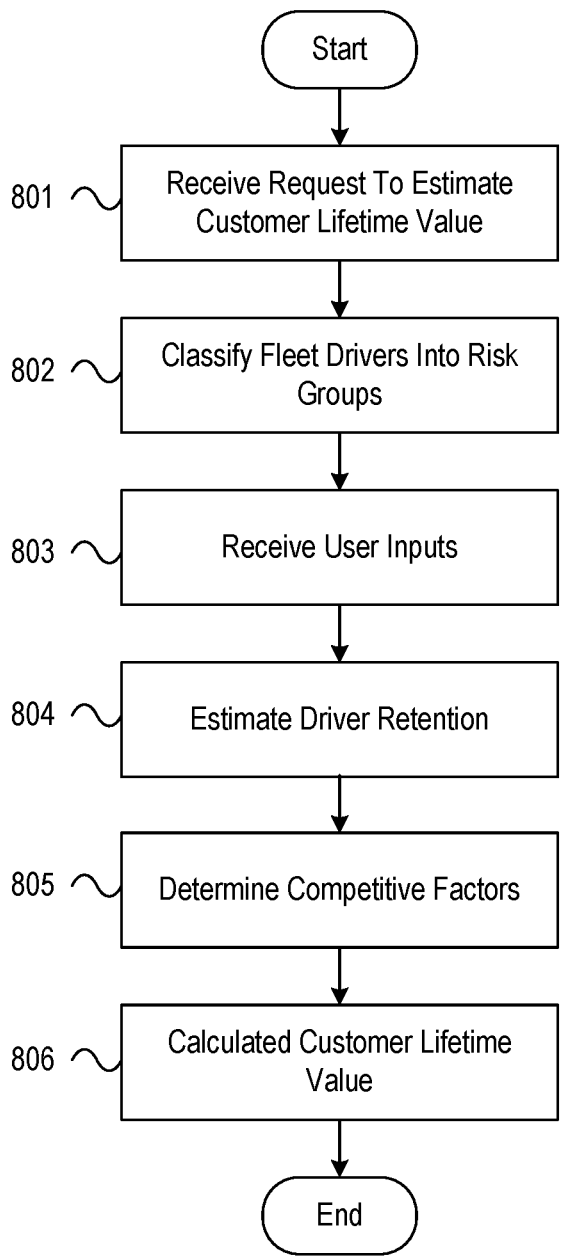
FIG. 8 depicts an illustrative method for estimating customer lifetime value for a shared mobility service in accordance with one or more example embodiments.

FIG. 8 depicts an illustrative method for estimating customer lifetime value for a shared mobility service in accordance with one or more example embodiments. A customer lifetime value may represent the total expected net profit associated with an average customer of the shared mobility service.

At step 801, the shared mobility support platform 110 may receive a request to estimate customer lifetime value from a user (e.g., a user associated with a shared mobility service system 120, 130, or 140).

At step 802, the shared mobility support platform 110 may group the drivers into risk groups (e.g., as described above for step 502).

At step 803, the shared mobility support platform 110 may receive user inputs indicating minimum and maximum revenues per day for the various risk groups (e.g., as described above for step 503), an average number of days per driver/year (e.g., as described above for step 504), a retention rate (e.g., a rate indicating how long drivers and/or customers continue with the shared mobility service), and/or a driver lifespan (e.g., an average number of days for which drivers work for the platform). In some cases, the shared mobility support platform 110 may provide default numbers for an average number of days working per driver, a retention rate, and/or a driver lifespan that are generated based on data collected from one or more of shared mobility service systems 120, 130, 140. The user may thus select the default number(s) if desired.

At step 804, the shared mobility support platform 110 may estimate a driver retention. The estimated driver retention may be a function of several factors, including demographics for each driver, a credit score for each driver, a number of times the driver has previously driven for and/or operated with the shared mobility service and/or one or more other shared mobility services, a length of time since the driver last drove for and/or operated with the shared mobility service and/or one or more other shared mobility services, an occupation of the driver, a vehicle ownership status of the driver, etc.

For example, the demographics of each driver may tend to indicate a driver retention. For example, drivers of a certain age (e.g., high-school age drivers) may be likely to leave the platform upon reaching a certain age (e.g., upon reaching college age) and may thus be associated with lower retention. Similarly, drivers of a certain age may be more likely to retire (thus lower retention). A higher credit score and/or other such factors, by contrast, may tend to indicate higher driver retention.

Similarly, a large number of times driving for the shared mobility service and/or one or more other shared mobility services may tend to indicate a higher retention. A shorter length of time since the driver last drove for the shared mobility service may tend to indicate a higher retention. Certain occupations (e.g., jobs held in addition to or before the shared mobility service job) may tend to be associated with higher retention. Driver ownership of a vehicle may also tend to be associated with a higher retention rate.

The shared mobility support platform 110 may thus calculate an estimated driver retention based on one or more of the above factors. For example, the shared mobility support platform 110 may use a machine learning model trained on data including the above factors correlated with historic driver retention to estimate retention.

At step 805, the shared mobility support platform 110 may determine one or more values indicating competitive and external factors. For example, the one or more values may indicate a number of alternative shared mobility services (e.g., alternative shared mobility services that operate in locations where the shared mobility service operates), a local market share of the shared mobility service (e.g., the portion of rides served by the shared mobility service vs. those served by alternative shared mobility services), current and/or predicted prices of gas, current and/or predicted prices of vehicles, current and/or predicted surge pricing, current and/or predicted weather, and the like.

The competitive factors may further include an impact of accidents. For example, if a customer experiences an accident while receiving a ride with one shared mobility service, the customer may be more likely to switch to another shared mobility service. Accordingly, information indicating a risk of accidents in competing shared mobility services may be considered as one of the competitive factors.

At step 806, the shared mobility support platform 110 may calculate a customer lifetime value. The customer lifetime value may be a function of the driver retention (e.g., the driver retention estimated at step 804 and/or the retention provided by the user at step 803), the local market share and other competitive and external factors, a discount rate, and a gross average revenue per customer. The calculated customer lifetime value may be displayed to the user.

FIG. 7 depicts an example user interface 700 for displaying a customer lifetime value estimate. The user interface 700 may include areas for inputting minimum/maximum dollar figures for various risk groups, average days per driver per year, a retention rate, and a driver's average lifetime (e.g., as described at step 803). The user interface 700 may further indicate an estimated customer lifetime value as determined at step 806.

Figure 9:
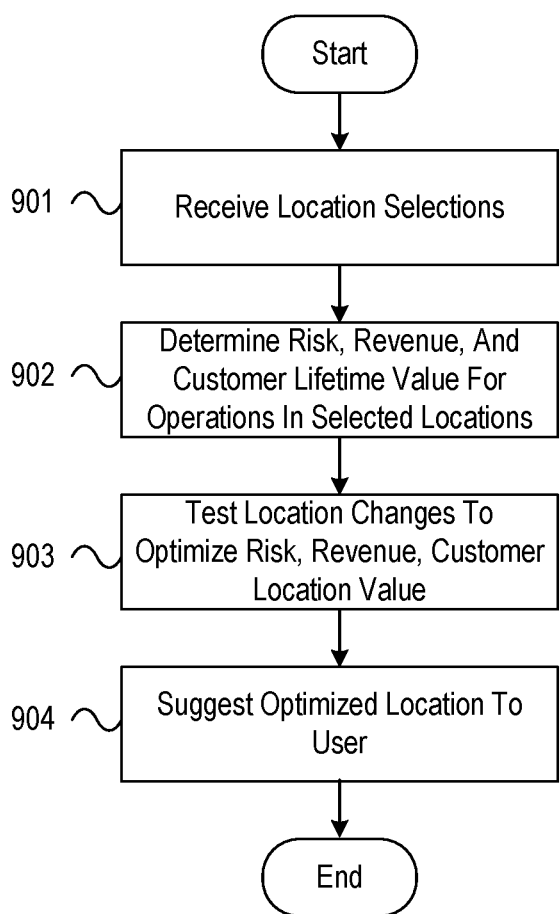
FIG. 9 depicts an illustrative method for calculating revenues and/or customer lifetime values based on location-restricting a shared mobility service in accordance with one or more example embodiments.

FIG. 9 depicts an illustrative method for calculating revenues and/or customer lifetime values based on location-restricting a shared mobility service in accordance with one or more example embodiments.

At step 901, a user may input locations to which the shared mobility service will restrict its service. For example, a restricted-location shared mobility service may pick up passengers only if they are within a certain location or set of locations defined by borders. Additionally or alternatively, a restricted-location shared mobility service may only allow trips to destinations that are within the borders, and/or to a different set of locations within different borders (e.g., the allowed drop-off area may be larger than the pickup area).

For example, the user may input a list of zip codes that are allowed pickup and/or dropoff zones. Additionally or alternatively, the user may draw and/or edit borders (e.g., on a map) to define one or more pickup and/or dropoff zones.

At step 902, the shared mobility support platform 110 may calculate one or more of risk, revenue, and/or customer lifetime value for the shared mobility service based on the proposed location restrictions. For example, the shared mobility support platform 110 may use the method of FIG. 5 to calculate a revenue for the location-restricted shared mobility service. However, when calculating the revenue using the method of FIG. 5, the shared mobility support platform 110 may use data specific to the pickup/dropoff locations. For example, the shared mobility support platform 110 may use information about predicted numbers of drivers on the road, location, events, and population density (e.g., as described at step 505) that pertains only to the allowed pickup/dropoff zones, thus providing estimates tailored to the specific locations selected at step 901.

Similarly, the shared mobility support platform 110 may use the method of FIG. 8 to calculate a customer lifetime value for the location-restricted shared mobility service. However, when calculating the customer lifetime value using the method of FIG. 8, the shared mobility support platform 110 may use data specific to the pickup/dropoff locations. For example, the shared mobility support platform 110 may use competitive and external factor information (e.g., as described at step 805) that pertains only to competitive operations in the allowed pickup/dropoff zones, thus providing estimates tailored to the specific locations selected at step 901.

At step 903, the shared mobility support platform 110 may automatically change the pickup/dropoff zones and retest the risk, revenue, and/or customer lifetime value calculations. For example, the shared mobility support platform 110 may add a zip code nearby the selected zip code(s) and/or remove one of the selected zip codes and recalculate revenue and/or customer lifetime value. If one or both of the revenue or customer lifetime value increases by adding/removing the automatically selected zip code, the shared mobility support platform 110 may continue adding/removing other nearby zip code(s) and testing. Changes that improve one or more of a risk, revenue, and/or a customer lifetime value may be kept and changes that do not improve one or more of a risk, revenue and/or a customer lifetime value may be reverted until the shared mobility support platform 110 finds a local maxima that optimizes risk, revenue, and/or customer lifetime value (e.g., the local maxima is found when the shared mobility support platform 110 cannot add/remove any nearby locations that improve the risk, revenue, and/or customer lifetime value).

Similarly, if the pickup/dropoff locations are defined by drawing/defining borders on a map, the shared mobility support platform 110 may adjust the borders (e.g., expand or contract the boundary a quarter mile in a random direction) and then recalculate risk, revenue, and/or customer lifetime value. The shared mobility support platform 110 may thus experiment with adjusting the borders and recalculating until it finds a local maxima that optimizes a risk (e.g., by lowering the risk), revenue (e.g., by increasing the revenue), and/or customer lifetime value (e.g., by increasing the customer lifetime value). For example, the local maxima may be found when the shared mobility support platform 110 cannot change the borders to further optimize one or more of the risk, revenue, and/or customer lifetime value. In some cases, an optimization function may combine risk, revenue, and customer lifetime value into a single score that may be optimized. Such a score may be inversely correlated with risk and positively correlated with revenue and customer lifetime value.

In some cases, the shared mobility support platform 110 may expand and/or contract the borders using isochrone analysis, which may indicate locations that are reachable in a certain amount of time from a given starting point. For example, the borders of a service area may initially be defined to include all of the areas that are reachable within 20 minutes of a given location (e.g., using an isochrone map). Such borders may be adjusted, in step 903, to encompass all of the areas that are reachable within 15 minutes (or 25 minutes) of a given location.

Then, at step 904, the shared mobility support platform 110 may suggest adding/removing locations and/or otherwise changing the selected pickup/dropoff zones in order to optimize the risks, revenues, and/or customer lifetime values, as determined at step 903. The risks, revenues, customer lifetime values, and suggestions for achieving optimized location restrictions may be displayed to the user.

FIG. 10 depicts an example user interface 1000 for displaying location-restricted revenue and customer lifetime value estimates. The user interface 1000 may include areas for inputting selected locations (e.g., as described at step 901, and which may also include a map for drawing borders, which is not illustrated). The user interface 1000 may also include the determined risk, revenue, and/or customer lifetime value figures for the selected locations (e.g., as described at step 902). The user interface 1000 may also include the suggestions for optimizing risk, revenue, and/or customer lifetime value (e.g., as determined at step 903).

Figure 11:
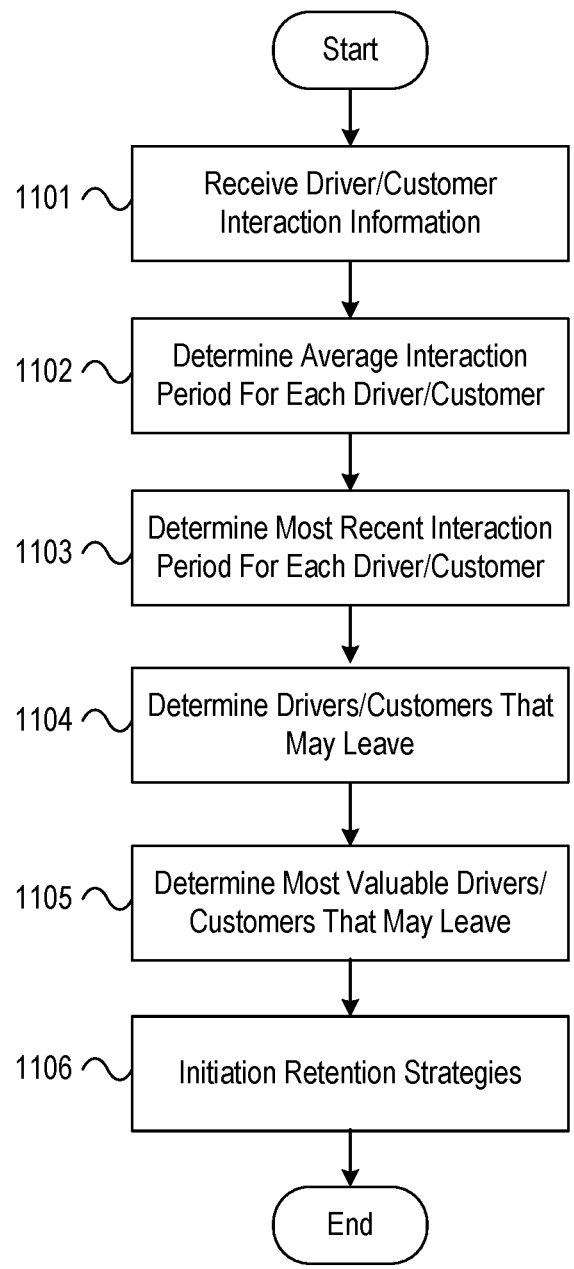
FIG. 11 depicts an illustrative method for increasing retention of drivers and/or customers based on interaction periods in accordance with one or more example embodiments.

FIG. 11 depicts an illustrative method for increasing retention of driver and/or customers based on interaction periods in accordance with one or more example embodiments.

At step 1101, the shared mobility support platform 110 may receive and/or customer interaction data for drivers and/or customers of a shared mobility service. The driver and/or customer interaction data may include full or partial driving and/or purchase histories for some or all shared mobility service driver and/or customers.

At step 1102, the shared mobility support platform 110 may determine an average interaction period for each driver or customer. For example, an average interaction period of one week means that a driver goes, on average, one week between drives for the share mobility service or that a customer goes, on average, one week between uses of the shared mobility service. The shared mobility support platform 110 may determine an average interaction period by averaging a number of interactions over the number of days between the earliest interaction and the latest interaction.

At step 1103, the shared mobility support platform 110 may determine a most recent interaction period for each customer. For example, the shared mobility support platform 110 may determine a number of days between the most recent interaction and the second-most-recent interaction for each driver or customer.

At step 1104, the shared mobility support platform 110 may determine which driver and/or customers are associated with most recent interaction periods that are higher than their corresponding average interaction periods. The shared mobility support platform 110 may determine that these customers may leave for another service because they have been driving with or using the shared mobility service less than normal recently.

At step 1105, the shared mobility support platform 110 may determine the most valuable of the driver or customers that may leave. For example, driver or customers that live in certain neighborhoods where the shared mobility service conducts frequent business may be considered desirable customers. As another example, drivers or customers with higher numbers of past interactions may be considered more valuable. As another example, driver or customers associated with lower risk may be considered more valuable.

In some cases, a user associated with a shared mobility service may have provided, to the shared mobility support platform, target information indicating one or more of target fleet-wide risk information, target revenue information, and target average and/or minimum customer lifetime value information. Drivers or customers associated with particular risk information, revenue information, or customer lifetime value information (which may be determined using methods as described in conjunction with FIGS. 2, 5, and 8 respectively) that satisfies certain criteria may be selected as the most valuable customer or drivers. For example, drivers associated with risk scores below a certain threshold, or that move fleet-wide risk in the direction of a target fleet-wise risk, may be selected as most valuable drivers. As another example, drivers and customers associated with particular revenue minimums may be selected as most valuable drivers and customers. As another example, customers associated with customer lifetime values above a certain threshold, or that move an average customer lifetime value in the direction of a target average customer lifetime value, may be selected as most valuable customers.

At step 1106, the shared mobility support platform 110 may recommend and/or cause the initiation of retention efforts aimed at retaining the valuable drivers or customers that may leave. For example, the shared mobility support platform 110 and/or an operator of a shared mobility service may reach out to the driver or customer (e.g., using telephone, email, etc.), offer a discount to the driver or customer, target advertisements to the driver or customer, ask for feedback on recent experiences with the shared mobility service, or perform other retention strategies.

The systems and methods described herein beneficially leverage information about drivers and/or customers as well as information about other shared mobility services to provide accurate estimations of various factors associated with a shared mobility service.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computer systems discussed above may be combined into a single computer system, and the various functions of each computer system may be performed by the single computer system. In such arrangements, any and/or all of the above-discussed communications between computer systems may correspond to data being accessed, moved, modified, updated, and/or otherwise used by the single computer system. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   receiving user inputs at a shared mobility support platform via a device associated with a shared mobility service indicating a service area of the shared mobility service;
   calculating at least one of risk, customer lifetime value, or revenue associated with provision of shared mobility services in the service area;
   determining an optimized service area, wherein the optimized service area is associated with at least one of a reduction in the risk or an increase at least one of the customer lifetime value or the revenue, wherein determining the optimized service area comprises:
      simulating an effect of changing a boundary of the service area via a machine learning model trained using historic demand levels; and
      determining whether one or more local maxima have been identified that optimizes at least one of risk, revenue, or customer lifetime value; and
   transmitting, to the device, an instruction to cause the device to indicate a suggestion to change the service area to the optimized service area.

2. The method of claim 1, wherein the user inputs comprises one or more zip codes.

3. The method of claim 1, wherein the user inputs defines a border of the service area on a map.

4. The method of claim 1, wherein changing the boundary of the service area comprises repeatedly modifying the boundary of the service area until the one or more local maxima is identified.

5. The method of claim 1, wherein the reduction in the risk is determined using a determined risk adjusted price per mile and an estimated demand.

6. The method of claim 1, further comprising:
   generating an instruction configured to cause a vehicle associated with the shared mobility service to pick up or drop off a passenger at a location that is outside the service area but inside the optimized service area; and
   transmitting the instruction to the device.

7. A shared mobility support platform comprising:
   one or more processors; and
   memory storing instructions that, when executed by the one or more processors, cause the shared mobility support platform to:
      receive one or more inputs via a device associated with a shared mobility service that indicate a service area of the shared mobility service;
      calculate at least one of risk, customer lifetime value, or revenue associated with provision of shared mobility services in the service area;
      determine an optimized service area, wherein the optimized service area is associated with at least one of a reduction in the risk or an increase in at least one of the customer lifetime value or the revenue, and wherein the optimized service area is determined by simulating an effect of changing a boundary of the service area via a machine learning model trained using historic demand levels until one or more local maxima have been identified that optimizes at least one of the risk, revenue, or customer lifetime value; and
      generate an instruction to cause the device to indicate a suggestion to modify the service area to the optimized service area.

8. The shared mobility support platform of claim 7, wherein the one or more inputs indicate a boundary of the service area.

9. The shared mobility support platform of claim 7, wherein the one or more inputs draw a boundary of the service area on a map.

10. The shared mobility support platform of claim 7, wherein, to change the boundary of the service area, the instructions, when executed by the one or more processors, cause the shared mobility support platform to repeatedly add or remove zip codes from the service area until the one or more local maxima is identified.

11. The shared mobility support platform of claim 7, wherein the instructions, when executed by the one or more processors, further cause the shared mobility support platform to calculate a risk adjusted price per mile.

12. The shared mobility support platform of claim 7, wherein the one or more inputs define a boundary of the service area on a map.

13. One or more non-transitory computer readable media storing computer-executable instructions that, when executed by one or more processors of a shared mobility support platform, cause the shared mobility support platform to:
   receive one or more user inputs via a device associated with a shared mobility service that indicate a service area of the shared mobility service;
   calculate at least one of risk, customer lifetime value, or revenue associated with provision of shared mobility services in the service area;
   determine an optimized service area, wherein the optimized service area is associated with one or more of a reduction in the risk or an increase in one or more of the customer lifetime value or the revenue, wherein determining the optimized service area comprises:
      simulating an effect of changing a boundary of the service area via a machine learning model trained using historic demand levels; and determining whether one or more local maxima have been identified that optimizes at least one of the risk, revenue, or customer lifetime value; and transmit an instruction to cause the device to indicate a recommendation to change the service area to the optimized service area.

14. The one or more non-transitory computer readable media of claim 13, wherein the one or more user inputs comprises one or more zip codes of desired pickup and dropoff zones.

15. The one or more non-transitory computer readable media of claim 13, wherein, to change the boundary of the service area, the instructions, when executed by the one or more processors, cause the shared mobility support platform to repeatedly change the boundary of the service are until the one or more local maxima is identified.

16. The one or more non-transitory computer readable media of claim 13, wherein the instructions, when executed by the one or more processors, further cause the shared mobility support platform to determine a reduction in the risk by:

determining a risk adjusted price per mile using one or more machine learning models trained to output the risk based on data inputs; and determine an estimated demand.

17. The one or more non-transitory computer readable media of claim 13, wherein the one or more user inputs define a boundary of the service area on a map.

* * * * *